United States Patent

Heiman et al.

(10) Patent No.: US 8,069,615 B2
(45) Date of Patent: Dec. 6, 2011

(54) SUPPORTED HOLLOW SEAL

(75) Inventors: Timothy D. Heiman, Warsaw, IN (US); Darron G. Peddle, Millersburg, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 694 days.

(21) Appl. No.: 12/038,485

(22) Filed: Feb. 27, 2008

(65) Prior Publication Data

US 2008/0265528 A1     Oct. 30, 2008

Related U.S. Application Data

(60) Provisional application No. 60/891,808, filed on Feb. 27, 2007, provisional application No. 60/941,496, filed on Jun. 1, 2007.

(51) Int. Cl.
*E06B 7/22* (2006.01)

(52) U.S. Cl. ........ 49/498.1; 49/499.1; 49/500.1

(58) Field of Classification Search .......... 49/498.1, 49/499.1, 500.1, 475.1
See application file for complete search history.

(56) References Cited

U.S. PATENT DOCUMENTS

| | | | | |
|---|---|---|---|---|
| 2,307,094 A * | 1/1943 | Yoxsimer | ......... | 49/496.1 |
| 2,607,966 A * | 8/1952 | Beck | ......... | 49/498.1 |
| 2,659,940 A * | 11/1953 | Beck | ......... | 49/498.1 |
| 2,942,308 A * | 6/1960 | Naeser et al. | ......... | 49/496.1 |
| 2,994,930 A * | 8/1961 | Cromwell | ......... | 49/498.1 |
| 4,756,944 A * | 7/1988 | Kisanuki | ......... | 428/122 |
| 4,858,385 A | 8/1989 | Bright | | |
| 4,937,126 A * | 6/1990 | Jackson | ......... | 428/122 |
| 5,042,200 A * | 8/1991 | Ugawa | ......... | 49/490.1 |
| 5,331,767 A * | 7/1994 | Takeuchi et al. | ......... | 49/490.1 |
| 5,367,830 A * | 11/1994 | Omura et al. | ......... | 49/475.1 |
| 5,500,264 A | 3/1996 | Yada et al. | | |
| 5,538,578 A * | 7/1996 | Sugawara et al. | ......... | 156/245 |
| 5,950,366 A * | 9/1999 | Uhlmeyer | ......... | 49/484.1 |
| 6,220,650 B1 | 4/2001 | Davis et al. | | |
| 6,299,235 B1 | 10/2001 | Davis et al. | | |
| 6,393,766 B2 * | 5/2002 | Nozaki et al. | ......... | 49/498.1 |
| 6,394,529 B2 | 5/2002 | Davis et al. | | |
| 6,405,489 B1 * | 6/2002 | Miura | ......... | 49/479.1 |
| 6,453,618 B1 * | 9/2002 | L'Angevin | ......... | 49/475.1 |
| 6,520,571 B2 | 2/2003 | Stemmer et al. | | |
| 6,530,618 B2 | 3/2003 | Nozaki et al. | | |
| 6,572,176 B2 | 6/2003 | Davis et al. | | |
| 6,623,014 B1 * | 9/2003 | Martin | ......... | 277/630 |
| 6,677,020 B2 | 1/2004 | Dron | | |
| 6,729,674 B2 | 5/2004 | Davis et al. | | |

(Continued)

FOREIGN PATENT DOCUMENTS

DE     3223384     12/1983

(Continued)

*Primary Examiner* — Peter Brown
*Assistant Examiner* — David E Allred
(74) *Attorney, Agent, or Firm* — Renner, Otto, Boisselle & Sklar, LLP (57) ABSTRACT

A hollow seal for use in sealing between relatively movable first and second panels, such as between a fixed window panel and a slidable window panel of a rear window of a pick-up truck or the like. The hollow seal has an internal geometry that supports an outside layer or portion of the seal under pressurization to prevent leakage and seal blowout. The outside portion is shaped to provide a pair of laterally spaced-apart sealing lips that have a pressure-activated sealing geometry for tight sealing against the panels when under pressurization.

20 Claims, 6 Drawing Sheets

U.S. PATENT DOCUMENTS

| | | | |
|---|---|---|---|
| 6,811,213 B2 | 11/2004 | Yamashita et al. | |
| 6,877,279 B2 | 4/2005 | Russell et al. | |
| 6,883,847 B2 | 4/2005 | Willett | |
| 6,922,945 B2 | 8/2005 | Dron | |
| 6,972,140 B2 * | 12/2005 | Watanabe | 428/36.9 |
| 7,155,863 B2 * | 1/2007 | Daniel et al. | 49/413 |
| 7,185,943 B2 | 3/2007 | Lesle et al. | |
| 7,380,862 B2 * | 6/2008 | Olney et al. | 296/107.04 |
| 2002/0140251 A1 | 10/2002 | Davis et al. | |
| 2002/0148163 A1 * | 10/2002 | Warner et al. | 49/209 |
| 2004/0031203 A1 | 2/2004 | Russell et al. | |
| 2004/0200151 A1 * | 10/2004 | Tognetti et al. | 49/377 |
| 2005/0178069 A1 | 8/2005 | Iwasa et al. | |
| 2006/0230686 A1 * | 10/2006 | Plum et al. | 49/498.1 |

FOREIGN PATENT DOCUMENTS

| | | |
|---|---|---|
| DE | 3919773 A1 * | 12/1990 |
| FR | 2682154 A1 * | 4/1993 |
| WO | WO 2004035340 A1 * | 4/2004 |
| WO | WO 2004108451 A2 * | 12/2004 |

* cited by examiner

SUPPORTED HOLLOW SEAL

RELATED APPLICATION DATA

This application claims the benefit of U.S. Provisional Application Nos. 60/891,808 filed Feb. 27, 2007 and 60/941,496 filed Jun. 1, 2007, which are hereby incorporated herein by reference in their entireties.

FIELD OF THE INVENTION

The herein described invention relates generally to hollow seals and more particularly to an internally self-supported hollow seal having particular application as a seal for a slidable window which may be used as a rear window in a pick-up truck, heavy truck sleeper applications, or in any other suitable application.

BACKGROUND OF THE INVENTION

Hollow seals heretofore have been used for various applications, including automotive window and door seals. Hollow seals are used to provide low closure force and large gap tolerances. Heretofore, hollow seals have been plagued by leaking or even seal blow out when subjected to externally applied water pressure. Consequently, water management systems have been needed in vehicle sheet metal and interior designs to accommodate the water leakage.

U.S. Pat. No. 7,155,863 discloses a slidable window for use in a rear window of a pick-up truck or the like, wherein the window structure includes a slidable window panel between a pair of fixed window panels. The sliding window panel has a seal carrier that supports an injection molded bulb seal. The bulb seal extends around an entire periphery of the sliding window panel so as to cover gap(s) adjacent the edge of the sliding window panel. One advantageous feature of such design is the sliding panel, when closed, is flush with the fixed window panels.

SUMMARY OF THE INVENTION

The present invention provides a hollow seal, and particularly a hollow seal that may be used to seal between relatively movable first and second panels, such as between a fixed window panel and a slidable window panel of a rear window of a pick-up truck or the like. The hollow seal has an internal geometry that supports an outside layer or portion of the seal under pressurization to prevent leakage and seal blowout in a manner previously unknown to the art. Thus, a hollow seal may be provided that can provide low closure force because of its hollow configuration and accommodate large gap tolerances, while still preventing or substantially preventing leaks and avoiding seal blowout. The internal cross section provides support for the outer seal portion against externally applied water and/or air pressure. That is, the internal geometry is matched to the deformed shape of the sealing contour, preventing unintended deflection under pressure. Due to this internal self support, the seal can maintain its sealing function, while maintaining low compression loads associated with traditional hollow seals.

In one embodiment, the outside portion is shaped to provide a pair of laterally spaced-apart sealing lips that have a pressure-activated sealing geometry for tight sealing against the panels when under pressurization.

More particularly, the hollow seal comprises a base portion configured for attachment to a second member, and an upper portion for forming with the base portion a hollow interior space allowing the upper portion to collapse toward the base portion when the hollow seal is engaged between the first and second members. The upper portion has a compressible sealing portion for sealing against an adjacent surface of the first member, and a foldable portion adjacent the sealing portion that collapses inwardly and upon itself when the compressible sealing portion is compressed downwardly toward the base portion by engagement with the first member. The base portion has a nesting recess for receiving and supporting the folded portion so at to maintain a seal between the compressible sealing portion and the first member when subjected to external fluid pressure acting on the upper portion.

In a preferred embodiment, the compressible sealing portion is in the form of a compressible sealing lip. The compressible sealing lip may have laterally inward and outward walls bounding a hollow interior, and the laterally inward wall of the compressible sealing lip may form one side of the foldable portion while another side of the foldable portion is formed by an adjacent portion of the upper portion.

The recess may be in the form of a groove that has a contour substantially the same as the bottom profile of the foldable portion when the foldable portion is folded upon itself and nested into the groove.

The side of the recess nearest the compressible sealing lip may be formed by a surface of the base portion that extends substantially perpendicular to a major planar extent of the base portion and a side of the recess remote from the compressible sealing lip may be sloped to said major planar extent.

The foldable portion may have an included angle of about 90 degrees when in its uncompressed state.

In a specific embodiment, the upper portion may have a second sealing lip and an intermediate portion extending laterally between the sealing lips, and the sealing lips may protrude outwardly away from the intermediate portion in a direction opposite the base portion for sealing a gap between the first member and the second member.

The sealing lips may have laterally outer surfaces sloped inwardly toward one another and laterally inner surfaces sloped inwardly toward one another to form pressure-activated sealing geometries operative in response to fluid pressure acting thereon to cause the sealing lips to rotate laterally outwardly and away from the base portion for pressure-activated sealing against the first and second members when engaged thereagainst.

The sealing lip may be joined to the base portion at a curved buckle portion having a thickness less than the thickness of the base portion at the location to which it is attached. The buckle portion may be located midway between the bottom of the base portion and uppermost end of the sealing lip.

The hollow seal may be formed by molding an elastomeric material as a single piece generally having a C-shape cross-section with the C-shape having a base formed by the buckle portion and upper and lower arms extending from the buckle portion, the upper and lower arms have at distal ends thereof mating surfaces that engage to form the hollow seal. One of the mating surfaces may have a groove and the other may have a correspondingly sized tongue for mating with the groove for locking the distal ends of the arms against relative lateral movement.

The base portion may be provided with a vent passage for venting air from hollow interior space.

The invention further provides a hollow seal in combination with the first and second panels, the second panel including the seal carrier to which the base portion of the hollow seal is attached with the first sealing lip resiliently biased against an interior surface of the second panel, and the second sealing lip being located laterally outward of the second panel for sealing against an inner surface of the second panel when the latter is moved into engagement therewith.

The first sealing lip may be spaced outwardly from the intermediate portion to form a gap for pressure-activating the seal when fluid under pressure enters a gap between adjacent peripheral edges of the first and second panels.

According to another aspect of the invention, a gasket profile comprises a first wall part having proximal and distal ends, and an interior surface defining a first bearing portion intermediate the first part proximal and distal ends; a second wall part cantilevered over the first part, the second wall part having proximal and distal ends, and an interior surface defining a second bearing portion intermediate the second wall part proximal and distal ends; and a connecting wall part extending between the proximal ends of the first and second wall parts; whereby the second wall part is deflectable such that in a deformed orientation of the gasket profile the second bearing portion of the second wall part contacts the first bearing portion of the first wall part to support the second wall part thereon with an internal chamber being defined between non-contacting portions of the first and second wall parts.

Further features of the invention will become apparent from the following detailed description when considered in conjunction with the drawings.

DETAILED DESCRIPTION

Referring now in detail to the drawings, FIGS. 1-5 show a rear window structure of a pickup truck to which the principles of the invention may be applied. The illustrated rear window structure is that disclosed in U.S. Pat. No. 7,155,863, which is hereby incorporated herein by reference. Although the invention will be chiefly described in this context, those skilled in the art, however, will appreciate that the principles of the herein described invention will have other applications where sealing between adjacent panels is desired.

Figure 1:
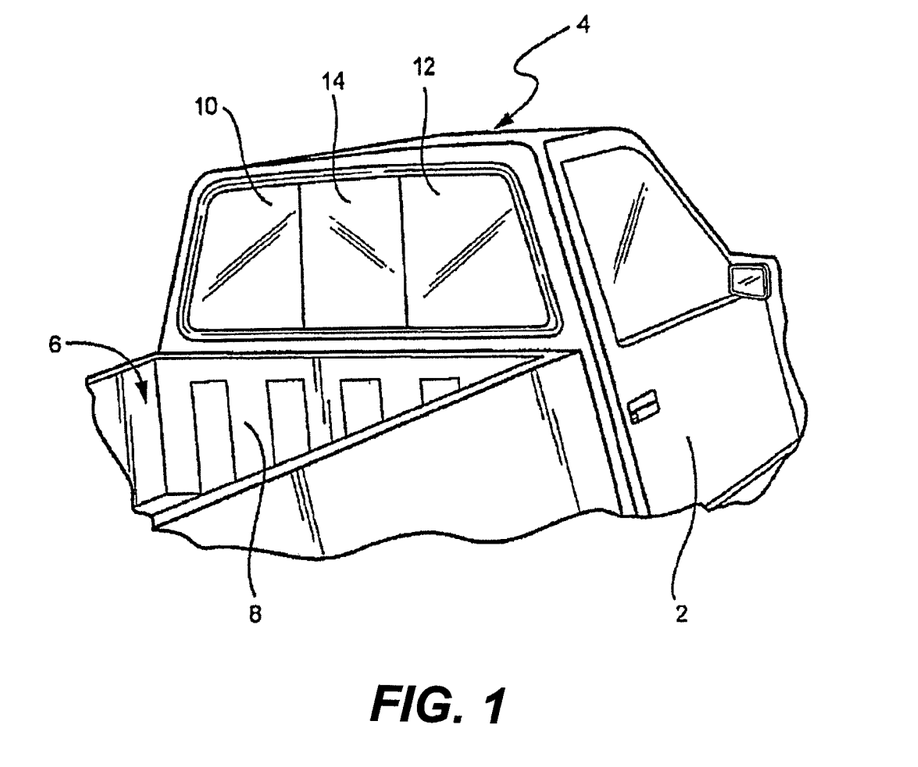
FIG. 1 is a perspective view of a rear window structure of a pick-up truck.

Referring now to FIG. 1, the illustrated pickup truck includes front door 2, a cab roof 4, and a truck bed 6 at least partially defined by front bed wall 8. The window structure includes first and second fixed panels (sheets) 10 and 12, and a slidable/movable panel (sheet) 14, all of which may be of or include glass, plastic, or the like. Each of panels 10, 12 and 14 may be substantially transparent for window viewing purposes, and each may be entirely flat or slightly curved/bent in shape, as may be desired. When the movable panel is in its closed position, it is flush with the fixed panels so as to provide a smooth and flowing appearance.

Figure 2:
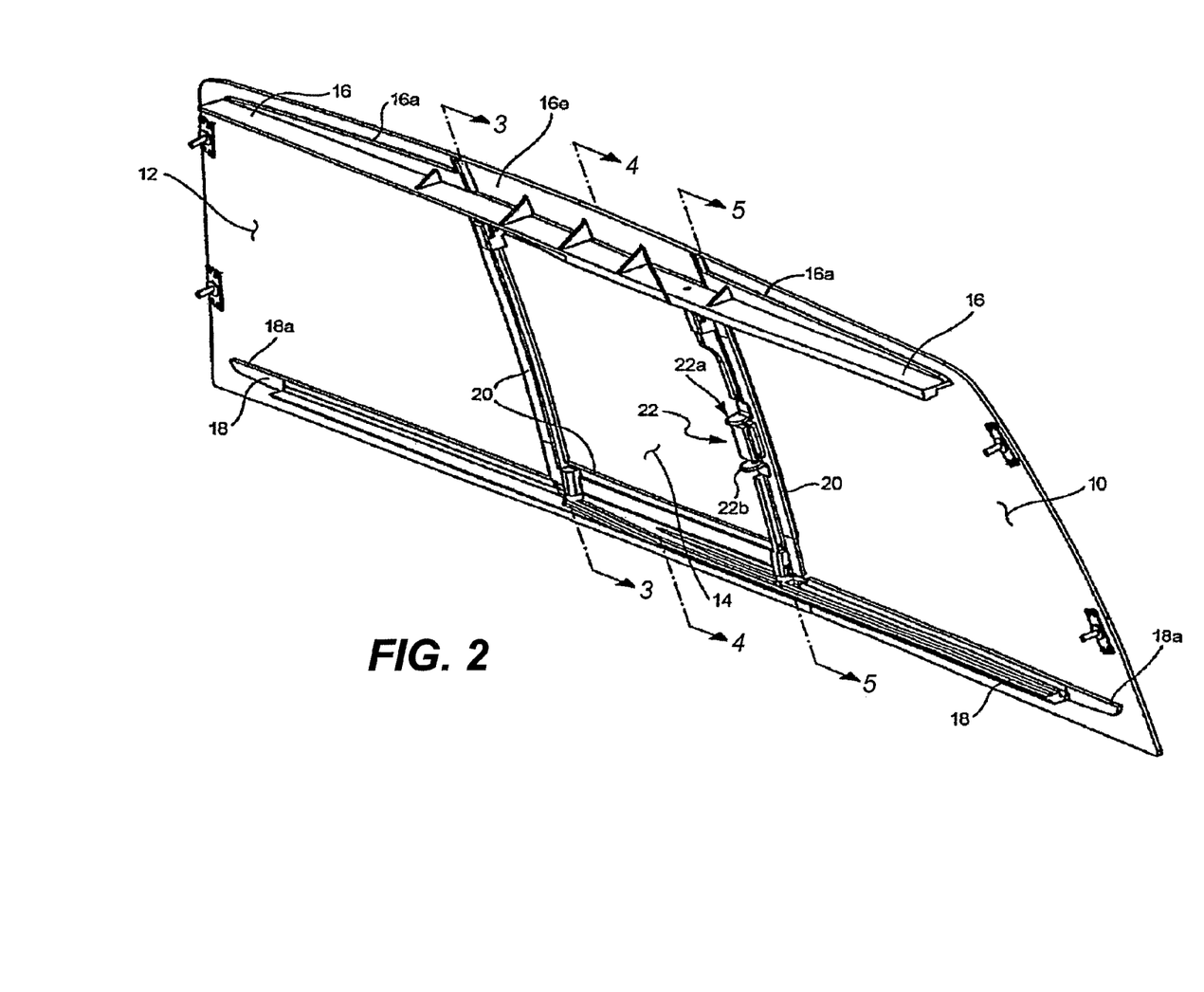
FIG. 2 is a perspective view of the window structure of FIG. 1 in the closed position, as viewed from the interior of the vehicle.
Figures 3, 4, 5:
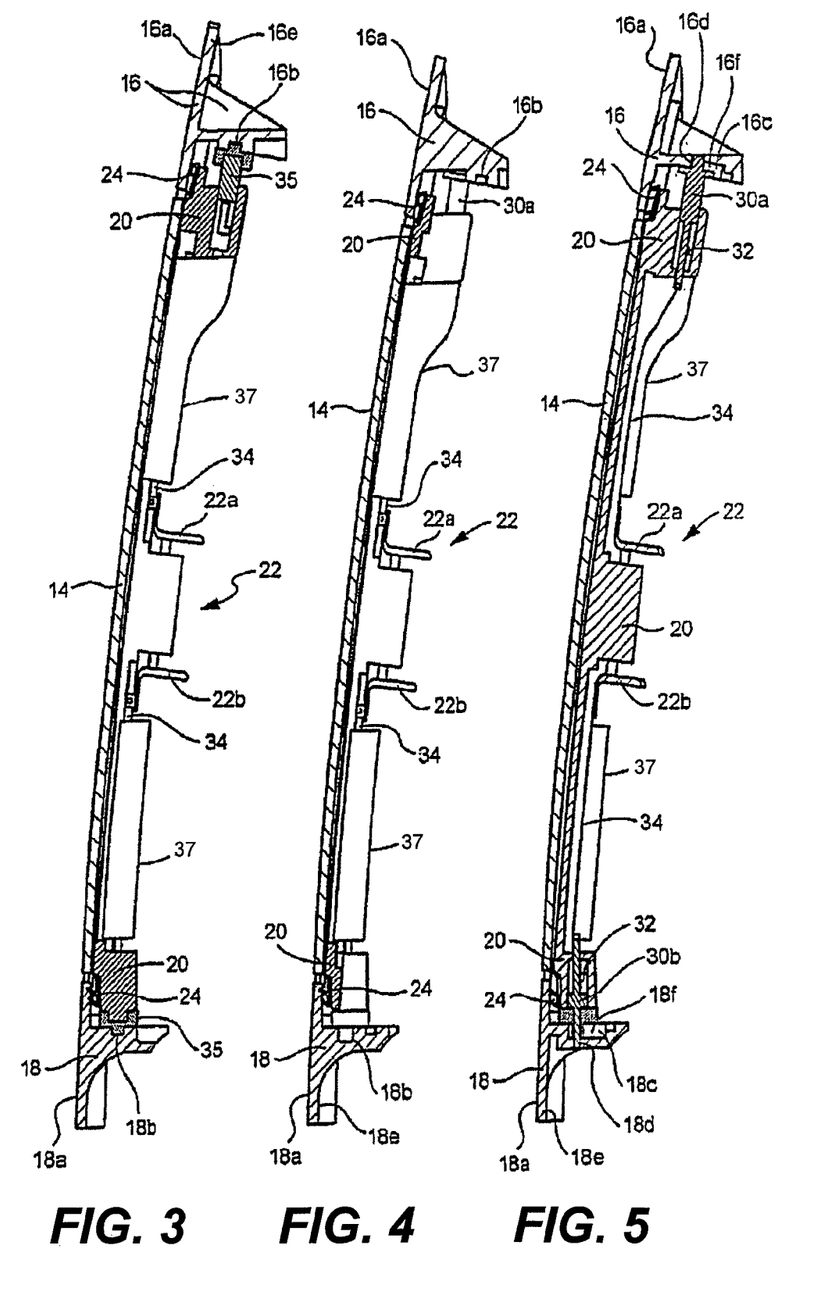
FIG. 3 is a cross-sectional view of the window structure of FIG. 2 in the closed position, taken along section line 3-3 of FIG. 2.
FIG. 4 is a cross-sectional view of the window structure of FIG. 2 in the closed position, taken along section line 4-4 of FIG. 2.
FIG. 5 is a cross-sectional view of the window structure of FIG. 2 in the closed position, taken along section line 5-5 of FIG. 2.

As seen in FIG. 2, the window structure includes a top frame 16, a bottom frame 18, a seal carrier 20 which is attached around at least part of the periphery of the movable panel 14, and a latch assembly 22 which is used to allow the slidable window panel 14 to be moved from a closed position to an opened position. The latch assembly 22 also locks the panel 14 in the closed position when this is desired.

As seen in FIGS. 2-5, each of top and bottom frames 16 and 18, respectively, include a substantially planar (planar or slightly curved) back portion 16a, 18a that is attached to a major surface of the fixed window panels 10 and 12 (but not to the movable panel 14). The substantially planar back portion 16a of top frame 16 may be bonded to the major interior surface of each of fixed panel 10 and fixed panel 12 at a top portion of each panel via an adhesive or the like. Likewise, the substantially planar back portion 18a of bottom frame 18 may be bonded to the major interior surface of each of fixed panel 10 and fixed panel 12 at a bottom portion of each panel via an adhesive or the like. Moreover, each of the top and bottom frames 16, 18 includes first and second tracks (16b, 16c, 18b, 18c) defined therein which receive pins operatively associated with the latch assembly. Both the top and bottom frames 16 and 18 may function as supports for fixed window panels 10 and 12, and also as track defining members which include tracks 16b, 16c, 18b, 18c that allow the slidable panel 14 to open and close in a sliding manner. The top and bottom frames 16 and 18 may be attached to the panels 10 and 12 in any suitable manner, including but not limited to via urethane adhesive, UV curable adhesive, encapsulation, double sided tape, or the like.

The movable panel 14 may be smaller in height than the fixed panels 10 and 12. Thus, in order to cover up voids arising from the smaller size of the movable panel 14, one or both frames may include filler or cover portions 16e, 18e (which may be referred to as appliques in certain instances) which cover such voids. Appliques 16e and/or 18e may or may not be integrally formed with the frames 16 and 18. The appliques 16e and 18e, for example, may be bonded to tracks or frames 16 and 18, respectively so that the frames/tracks support the appliques. The frames 16 and 18 may be formed of injection molded plastic, metal or any other suitable material, and the appliques 16e and 18e may be formed from a polymer based plastic material.

A seal carrier 20 may be attached to the peripheral portion of the movable window panel 14 via adhesive or the like. Thus, seal carrier 20 moves/slides along with the panel 14 when the panel is moved from the closed position to the opened position, and vice versa. The seal carrier 20 may be attached to the panel 14 around all four peripheral sides thereof at or close to the edge of the panel. Moreover, a seal 24 is provided on the seal carrier 20 for providing a weather seal between the movable panel 20 and the fixed panels 10 and 12, as well as the frames 16 and 18.

The dual pull latch assembly 22 may be mounted on and/or supported by seal carrier 20. The latch assembly 22 includes first and second finger grip portions 22a, 22b which are adapted to be selectively squeezed together by a user. When a user squeezes the finger grip portions 22a and 22b toward one another with his/her fingers, this causes respective cables 34 to move toward one another thereby pulling pin structures 30a and 30b toward one another and out of apertures/cut-outs 16d and 18d, respectively, against the biasing force of springs 32. When the spring loaded pin structures have been pulled from apertures/cut-outs, the panel 14 may be kicked or will pop inwardly toward the vehicle interior and then slid laterally in order to open the window.

Figure 6:
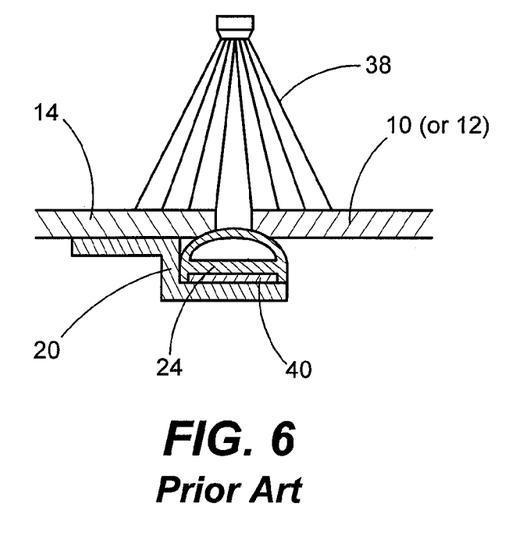
FIG. 6 is a cross-sectional view of a prior art hollow bulb seal supported by a seal carrier.
Figure 7:
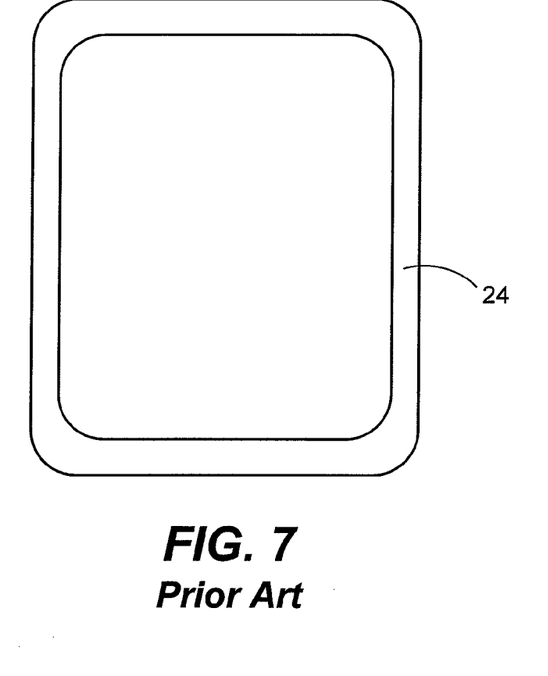
FIG. 7 is a top plan view of the prior art hollow bulb seal of FIG. 6.

Referring now to FIGS. 6 and 7, details of the prior art hollow bulb seal 24 can be seen. The seal is supported by the seal carrier 20 and may be four-sided so as to be located about the periphery of the movable panel for sealing between the panel 14 and the adjacent fixed panels 10 and 12 and frames 16 and 18, so as to provide a weather seal around all four sides of the movable panel 14. That is, the seal 24 forms a water seal to prevent water 38 from the exterior of the vehicle from making its way through the gap(s) between the movable panel 14 and the adjacent panel (10 and/or 12) as shown in FIG. 6.

As known in the art, the seal 24 may be formed by formed by extrusion and then spliced at its ends, or by injection molding as a unitary structure having a C-shape cross-section, where the distal free ends of the arms of the C-shape are provided with a tongue and groove that engage to form the hollow seal. An injection molded one-piece bulb seal 24 is advantageous with respect to other seal types, as such can eliminate the need for weld/splice corners that are a weak point and can lead to leakage. Moreover, the use of injection molding to form a one-piece seal 24 allows the cross section of the seal 24 to be varied. The prior art seal 24 can have a larger surface area at corner areas to provide added sealing functionality at such areas. This is advantageous in that corner areas are typical seal failure points.

The bottom surface of the base 70 may be attached to the seal carrier 20 via double-sided adhesive tape or any other suitable adhesive 40 as shown in FIG. 6. The tape/adhesive 80 may be located in a recess formed in the bottom surface of the base of the seal. The flexible bulb seal 24 may be made of or comprise an elastomer or compression set material (e.g., EPDM).

While the prior art bulb seal 24 is functional, it is subject to leakage and/or seal blowout when subjected to pressurized fluid, such as when a hose directs a high pressure stream of water against the seal, as may occur during washing of the car. Other instances of leakage or seal blowout may result from high winds acting on the seal with or without rain.

The present invention provides a hollow seal for various applications including for use in sealing between relatively movable first and second panels, such as between the fixed window panels 10 and 12 and the slidable window panel 14. The hollow seal has an internal geometry that supports an outside layer or portion of the seal under pressurization to prevent leakage and seal blowout. In the illustrated embodiment, the outside portion is shaped to provide a pair of laterally spaced-apart sealing lips that have a pressure-activated sealing geometry for tight sealing against the panels when under pressurization.

Figure 8:
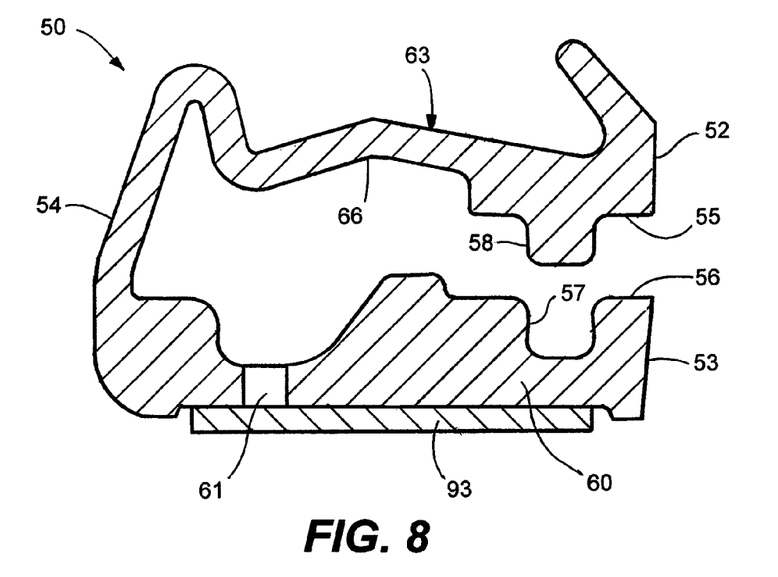
FIG. 8 is a cross-sectional view of an exemplary hollow seal according to the present invention, shown as molded.
Figure 9:
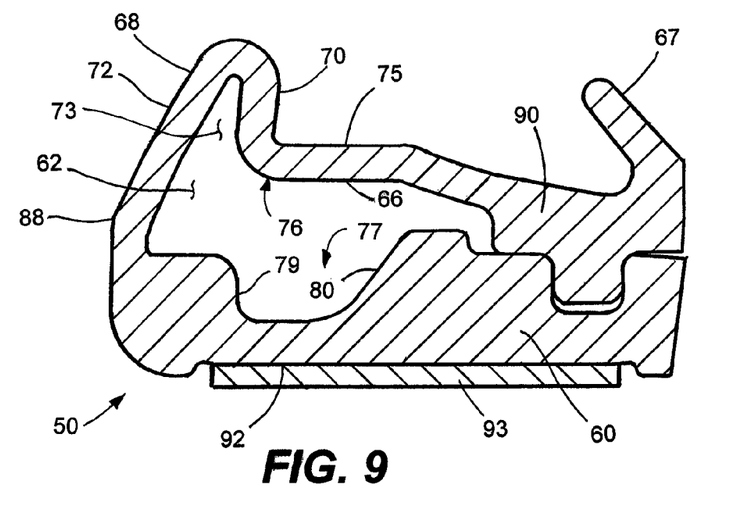
FIG. 9 is a cross-sectional view of the hollow seal of FIG. 8, showing the seal in an assembled condition.

In FIG. 8, an exemplary hollow seal 50 according to the invention is illustrated. Although other means may be used to form the hollow seal 50, such as extrusion, the hollow seal 50 preferably is formed as a single piece by injection molding, thereby eliminating the need for splices or weld joints at the corners of the seal which in plan view will be generally rectangular like the seal 24 shown in FIG. 7. FIG. 8 shows the molded configuration of a preferred seal, whereas FIG. 9 shows the assembled configuration of the seal 50. The seal may be made of any suitable material, such as an elastomeric material. An exemplary elastomeric material is peroxide cured ethylene propylene diene rubber.

As seen in FIG. 8, the illustrated exemplary hollow seal 50 generally has a C-shape cross-section with the C-shape having upper and lower arms 52 and 53 extending from a base portion 54 of the C-shape. The upper and lower arms have at distal ends thereof mating surfaces 55 and 56 that engage to form the hollow seal as seen in FIG. 9. One of the mating surfaces has a groove 57 and the other has a correspondingly sized tongue 58 for mating with the groove for locking the distal ends of the arms against relative lateral movement. The lower arm 53, which forms a base portion 60 of the seal, is provided with a vent passage 61 for venting air from hollow interior space 62 so as to allow an upper portion 63 of the seal, formed in substantial part by the upper arm 52, to collapse toward the base portion 60 when compressed between the movable and fixed panels as described in greater detail below.

Figure 10:
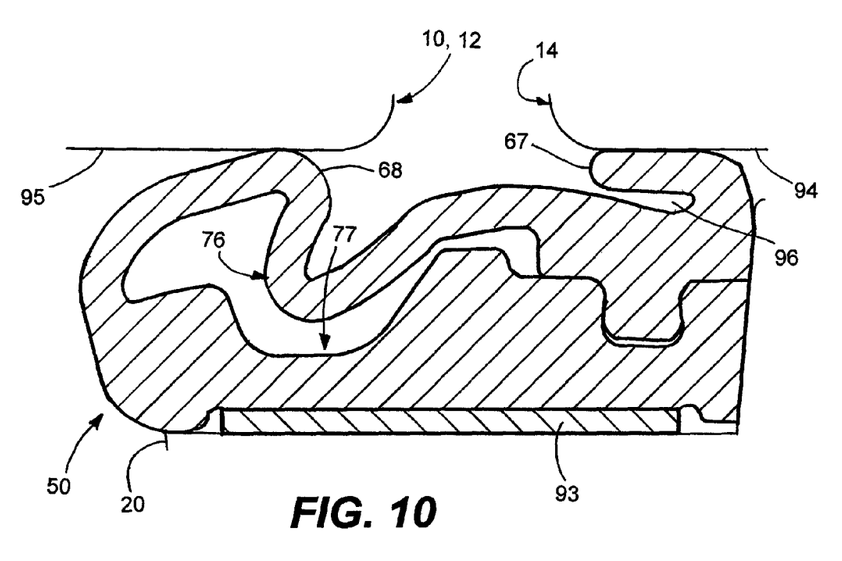
FIG. 10 is a cross-sectional view of the hollow seal of FIG. 9, shown assembled to the fixed and movable window panels with the movable window panel shown closed against the hollow seal.

With reference to FIG. 9, the hollow seal 50 comprises the base portion 60 that is configured for attachment to the seal carrier 20 (FIG. 10) on the moveable panels 14, and the upper portion 63 that forms with the base portion the hollow interior space 62 allowing the upper portion to collapse toward the base portion when the hollow seal is engaged between the fixed and movable panels as illustrated in FIG. 10. The upper portion 63 has an intermediate portion 66 extending laterally between a first compressible sealing portion 67 that may be in the form of a lip and a second sealing portion 68 that may be in the form of a lip. The first sealing lip and the second sealing lip protrude outwardly (upwardly in FIG. 9) away from the intermediate portion in a direction opposite the base portion for respectively engaging the movable and fixed panels for sealing a gap therebetween.

The second sealing lip 68 preferably has laterally inward and outward walls 70 and 72 bounding a hollow interior 73. The laterally inward wall of the second seal forms with an adjacent wall 75 of the intermediate portion 66 a foldable portion 76 that collapses inwardly and upon itself when the second sealing lip is compressed downwardly toward the base portion as illustrated in FIG. 10. The base portion has a recess, such as a groove 77, for receiving and supporting the folded portion 76 so at to maintain a seal between the second sealing lip 68 and the fixed panel when subjected to external fluid pressure. The recess/groove has a contour substantially the same as the bottom profile of the foldable portion when the foldable portion is folded upon itself and compressed into the groove. In the illustrated embodiment, the side 79 of the groove nearest the second sealing lip is formed by a surface of the base portion that extends substantially perpendicular to a major planar extent of the base portion and the side 80 of the groove nearest the first sealing lip is sloped to said major planar extent. The foldable portion may have an included angle of about 90 degrees when in its uncompressed state shown in FIG. 9.

The first sealing lip and second sealing lip preferably have laterally outer surfaces sloped inwardly toward one another. The first sealing lip and second sealing lip also preferably have laterally inner surfaces sloped inwardly toward one another to form pressure-activated sealing geometries operative in response to fluid pressure acting thereon to cause the first and second sealing lips to rotate laterally outwardly and away from the base portion for pressure-activated sealing against the first and second panels when engaged thereagainst.

The second sealing lip 68 may joined to the base portion 60 at a curved buckle portion 88 having a thickness less than the thickness of the base portion at the location to which it is attached. The buckle portion may have the same thickness as the part of the upper portion forming the second sealing lip and the intermediate portion up to an increased thickness portion 90 from which the first sealing lip extends and which includes the tongue that mates with the groove in the base portion. The buckle portion may be located midway between the bottom of the base portion and uppermost end of the second sealing lip as shown.

The base portion 60 may have a planar bottom surface 92 to which an adhesive tape 93 is attached for securing the seal to the seal carrier 20. The adhesive tape may be, for example, a double-sided pressure sensitive foam backed adhesive tape that facilitates assembly of the tape to the bottom surface of the base portion which may be recessed as shown, and to the carrier when assembled therewith.

As shown in FIG. 10, the seal may be assembled to the carrier 20 with the adhesive tape, or by any other suitable means. The first sealing lip 67 will be resiliently compressed against an interior surface 94 of the movable panel 14 while the second sealing 68 lip will be located laterally outward of the movable panel for sealing against an inner surface 95 of the adjacent fixed panel 10, 12 (or frame member) when the latter is engaged therewith in the closed position of the movable panel. The first sealing lip may be spaced slightly outwardly from the intermediate portion to form a gap 96 for pressure-activating the seal when fluid under pressure enters a gap between adjacent peripheral edges of the first and second panels.

When the movable panel 14 is in its closed position shown in FIG. 10, the second or hollow sealing lip 68 will be compressed toward the base portion. The foldable portion 76 of the upper portion will fold upon itself and be captured (nested) in the recess/groove 77 in the inner surface of the base portion. If the second seal is subjected to external high pressure, such as may be caused by a high pressure stream of water or high winds, the extent to which it can collapse is limited by the walls of the groove which thus functions as a backstop or internal support to prevent seal blowout. The second seal, because of its geometry, will also be pressure-activated to provide a tight seal against the interior surface of the fixed panel.

In other words, the base portion of the hollow seal or gasket 50 forms a first wall part having proximal and distal ends, and an interior surface defining a first bearing portion intermediate the first part proximal and distal ends. The upper portion forms a second wall part cantilevered over the first part. The second wall part has proximal and distal ends, and an interior surface defining a second bearing portion intermediate the second wall part proximal and distal ends. The buckle portion forms a connecting wall part extending between the proximal ends of the first and second wall parts, whereby the second wall part is deflectable such that in a deformed orientation of the gasket profile the second bearing portion of the second wall part contacts the first bearing portion of the first wall part to support the second wall part thereon with an internal chamber being defined between non-contacting portions of the first and second wall parts.

As will now be appreciated by those skilled in the art, the present invention provides a hollow molded seal that can provide low closure force because of its hollow configurations and accommodate large gap tolerances while still preventing or substantially preventing leaks and avoiding seal blowout. The internal cross section provides support for the outer seal portion against externally applied water and/or air pressure. That is, the internal geometry is matched to the deformed shape of the sealing contour, preventing unintended deflection under pressure. Due to this internal self support, the seal can maintain its sealing function, while maintaining low compression loads associated with traditional hollow seals.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hollow seal for use in sealing to a first member, the hollow seal comprising a base portion configured for attachment to a second member, the base portion having a proximal end and a distal end, and an upper portion for forming with the base portion a hollow interior space allowing the upper portion to collapse toward the base portion when the hollow seal is engaged between the first and second members, the upper portion having a compressible sealing portion for sealing against an adjacent surface of the first member, the compressible sealing portion being joined to the base portion by a buckle portion extending upward from the proximal end of the base portion, and a foldable portion adjacent the sealing portion that collapses inwardly and upon itself when the compressible sealing portion is compressed downwardly toward the base portion by engagement with the first member, and the base portion having a nesting recess for receiving and supporting the foldable portion so as to maintain a seal between the compressible sealing portion and the first member when subjected to external fluid pressure acting on the upper portion, wherein the nesting recess has a side surface extending substantially perpendicular to a major planar extent of the base portion and facing the distal end of the base portion, and wherein the side surface is disposed in the path of the foldable portion when the upper portion is exposed to external fluid pressure at a distal side of the compressible sealing portion so that movement of the foldable portion is restricted by engagement with the side surface to prevent the compressible sealing portion from being blown out, wherein the hollow seal is formed by molding as a single piece generally having a C-shape, wherein the base portion and upper portion have at distal ends thereof mating surfaces that engage to form the hollow seal, and wherein one of the mating surfaces has a locking recess and the other has a correspondingly sized projection for mating with the locking recess for locking the distal ends of the base portion and upper portion against relative lateral movement.

2. A hollow seal as set forth in claim 1, wherein the compressible sealing portion is in the form of a compressible sealing lip.

3. A hollow seal as set forth in claim 2, wherein the compressible sealing lip has laterally inward and outward walls bounding a hollow interior, and the laterally inward wall of the compressible sealing lip forms one side of the foldable portion while another side of the foldable portion is formed by an adjacent portion of the upper portion.

4. A hollow seal as set forth in claim 3, wherein the recess is in the form of a groove that has a contour substantially the same as a bottom profile of the foldable portion when the foldable portion is folded upon itself and nested into the groove.

5. A hollow seal as set forth in claim 1, wherein the recess includes a second side remote from the proximal end that is sloped to said major planar extent.

6. A hollow seal as set forth in claim 4, wherein the foldable portion has an included angle of about 90 degrees when in its uncompressed state.

7. A hollow seal as set forth in claim 3, wherein the upper portion has a second sealing lip and an intermediate portion extending laterally between the sealing lips, and the sealing lips protrude outwardly away from the intermediate portion in a direction opposite the base portion for sealing a gap between the first member and the second member.

8. A hollow seal as set forth in claim 7, wherein the sealing lips have laterally outer surfaces sloped inwardly toward one another.

9. A hollow seal as set forth in claim 7, wherein the sealing lips have laterally inner surfaces sloped inwardly toward one another to form pressure-activated sealing geometries operative in response to fluid pressure acting thereon to cause the sealing lips to rotate laterally outwardly and away from the base portion for pressure-activated sealing against the first and second members when engaged thereagainst.

10. A hollow seal as set forth in claim 3, wherein the buckle portion is a curved buckle portion having a thickness less than a thickness of the base portion at the proximal end of the base portion.

11. A hollow seal as set forth in claim 10, wherein the buckle portion is located midway between a bottom of the base portion and an uppermost end of the sealing lip.

12. A hollow seal as set forth in claim 1, wherein the seal is made of an elastomeric material.

13. A hollow seal as set forth in claim 1, wherein the base portion has a planar bottom surface to which an adhesive tape is attached.

14. A hollow seal as set forth in claim 1, wherein the base portion is provided with a vent passage for venting air from hollow interior space.

15. A hollow seal as set forth in claim 1, in combination with the first and second members respectively formed by relatively movable first and second panels, the second panel including a seal carrier to which the base portion of the hollow seal is attached with a second sealing portion formed by the upper portion resiliently biased against an interior surface of the second panel, and the compressible sealing portion is located laterally outward of the second panel for sealing against an inner surface of the second panel when the latter is moved into engagement therewith.

16. The combination as set forth in claim 15, wherein the compressible sealing portion is spaced outwardly from an intermediate portion of the upper portion extending laterally between the sealing portions to form a gap for pressure-activating the seal when fluid under pressure enters a gap between adjacent peripheral edges of the first and second panels.

17. A hollow seal for use in sealing to a first member, the hollow seal comprising a base portion configured for attachment to a second member, the base portion having a proximal end and a distal end, and an upper portion for forming with the base portion a hollow interior space allowing the upper portion to collapse toward the base portion when the hollow seal is engaged between the first and second members, the upper portion having a compressible sealing portion for sealing against an adjacent surface of the first member, the compressible sealing portion being joined to the base portion by a buckle portion extending upward from the proximal end of the base portion, and a foldable portion adjacent the sealing portion that collapses inwardly and upon itself when the compressible sealing portion is compressed downwardly toward the base portion by engagement with the first member, and the base portion having a nesting recess for receiving and supporting the foldable portion so as to maintain a seal between the compressible sealing portion and the first member when subjected to external fluid pressure acting on the upper portion, wherein the nesting recess has a side surface extending substantially perpendicular to a major planar extent of the base portion and facing the distal end of the base portion, and wherein the side surface is disposed in the path of the foldable portion when the upper portion is exposed to external fluid pressure at a distal side of the compressible sealing portion so that movement of the foldable portion is restricted by engagement with the side surface to prevent the compressible sealing portion from being blown out, the hollow seal in combination with the first and second members respectively formed by relatively movable first and second panels, the second panel including a seal carrier to which the base portion of the hollow seal is attached with a second sealing portion formed by the upper portion resiliently biased against an interior surface of the second panel, and the compressible sealing portion is located laterally outward of the second panel for sealing against an inner surface of the second panel when the latter is moved into engagement therewith, wherein the compressible sealing portion is spaced outwardly from an intermediate portion of the upper portion extending laterally between the sealing portions to form a gap for pressure-activating the seal when fluid under pressure enters a gap between adjacent peripheral edges of the first and second panels, and wherein the first and second panels are glass panels, and the hollow seal extends continuously around a perimeter of the second glass panel.

18. A hollow seal as set forth in claim 1, wherein the side surface is formed on a proximal wall of the base portion, the proximal wall having a thickness greater than a thickness of the buckle portion.

19. A hollow seal as set forth in claim 1, wherein the compressible sealing portion is rounded.

20. A gasket profile comprising:

a first wall part having proximal and distal ends, and an interior surface defining a first bearing portion intermediate the first part proximal and distal ends, the first bearing portion having a side surface extending substantially perpendicular to a major planar extent of the first wall part and facing the distal end of the first wall part;

a second wall part cantilevered over the first part, the second wall part having proximal and distal ends, and an interior surface defining a second bearing portion intermediate the second wall part proximal and distal ends; and a connecting wall part extending between the proximal ends of the first and second wall parts;

whereby the second wall part is deflectable such that in a deformed orientation of the gasket profile the second bearing portion of the second wall part contacts the first bearing portion of the first wall part to support the second wall part thereon with an internal chamber being defined between non-contacting portions of the first and second wall parts,
wherein the second bearing portion includes a foldable portion that collapses inwardly and upon itself when the second wall part is deflected, and wherein the side surface is disposed in a path of the foldable portion when the second wall is exposed to external fluid pressure at a distal side of the second bearing portion,
wherein the side surface is formed on a proximal wall of the first wall part, the proximal wall having a thickness greater than a thickness of the connecting wall part.

* * * * *